US011920778B2

(12) United States Patent
Huang et al.

(10) Patent No.: US 11,920,778 B2
(45) Date of Patent: Mar. 5, 2024

(54) LIGHTING VENTILATION FAN HAVING AXIAL FUNCTION MODULE AND GRILLE WITH LATERAL INLET

(71) Applicant: Delta Electronics, Inc., Taoyuan (TW)

(72) Inventors: Yu-Hsiang Huang, Taoyuan (TW); Yen-Lin Chen, Taoyuan (TW); Chih-Hua Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/957,150

(22) Filed: Sep. 30, 2022

(65) Prior Publication Data

US 2023/0022241 A1 Jan. 26, 2023

Related U.S. Application Data

(63) Continuation of application No. 17/564,635, filed on Dec. 29, 2021, now Pat. No. 11,499,708.

(60) Provisional application No. 63/133,515, filed on Jan. 4, 2021.

(51) Int. Cl.

| | |
|---|---|
| ***F24F 13/078*** | (2006.01) |
| ***F21S 8/02*** | (2006.01) |
| ***F21V 3/02*** | (2006.01) |
| ***F21V 33/00*** | (2006.01) |
| *F21Y 115/10* | (2016.01) |

(52) U.S. Cl.
CPC .......... *F21V 33/0096* (2013.01); *F21S 8/026* (2013.01); *F21V 3/02* (2013.01); *F21Y 2115/10* (2016.08)

(58) Field of Classification Search
CPC ........ F24F 13/08; F24F 13/082; F24F 13/084; F24F 2013/207; F24F 2221/14; F24F 1/0022; F24F 13/078; F24F 2221/02
See application file for complete search history.

(56) References Cited

U.S. PATENT DOCUMENTS

| | | | | |
|---|---|---|---|---|
| 3,324,784 A * | 6/1967 | Lambie et al. | F24F 7/025 | 415/207 |
| 6,470,699 B1 * | 10/2002 | Okuda | F24F 1/0007 | 62/DIG. 16 |
| 8,382,332 B2 * | 2/2013 | Zakula | F24F 13/078 | 362/249.02 |
| 9,557,070 B2 * | 1/2017 | Song | F24F 1/0057 | |
| 9,609,407 B2 | 3/2017 | Berkman et al. | | |

(Continued)

FOREIGN PATENT DOCUMENTS

| | | |
|---|---|---|
| CN | 1654881 A | 8/2005 |
| CN | 207935893 U | 10/2018 |

(Continued)

*Primary Examiner* — Ismael Negron
(74) *Attorney, Agent, or Firm* — KIRTON McCONKIE; Evan R. Witt

(57) ABSTRACT

A ventilation fan includes a housing having an opening, a grille structure positioned to cover the opening, a fan module provided in the housing and a function module. The grille structure includes a base defining an outlet, and a grille support spaced apart from the base and connected by the connecting columns A radial inlet is formed between the base and the grille support is in communication with the outlet. The base includes a holder having a holding opening axially downward and faced away from the housing. The function module is disposed within the holder through the holding opening.

12 Claims, 8 Drawing Sheets

1

(56) References Cited

U.S. PATENT DOCUMENTS

| | | | | |
|---|---|---|---|---|
| 10,156,381 | B1 * | 12/2018 | Settler | F24F 13/078 |
| 10,808,727 | B2 | 10/2020 | Liu et al. | |
| 10,837,662 | B2 * | 11/2020 | Maeda | F24F 7/007 |
| 11,022,290 | B2 * | 6/2021 | Chen | H05B 47/11 |
| 2010/0009621 | A1 * | 1/2010 | Hsieh | F24F 7/007 454/349 |
| 2012/0087132 | A1 * | 4/2012 | Zakula | F24F 13/078 362/373 |
| 2012/0087138 | A1 * | 4/2012 | Pringle | F24F 13/078 362/373 |
| 2015/0159910 | A1 * | 6/2015 | Huang | F24F 13/28 415/121.2 |
| 2016/0108925 | A1 * | 4/2016 | Huang | F24F 7/007 415/121.3 |
| 2018/0066838 | A1 * | 3/2018 | Huang | F04D 25/088 |
| 2020/0158122 | A1 | 5/2020 | Huang et al. | |

FOREIGN PATENT DOCUMENTS

| | | | |
|---|---|---|---|
| IN | 110145482 | A | 8/2019 |
| JP | 3231572 | B2 | 11/2001 |
| KR | 20110005268 | U | 5/2011 |
| TW | M344460 | U | 11/2008 |
| TW | 201614175 | A | 4/2016 |
| TW | I631298 | B | 8/2018 |

* cited by examiner

LIGHTING VENTILATION FAN HAVING AXIAL FUNCTION MODULE AND GRILLE WITH LATERAL INLET

CROSS REFERENCE TO RELATED APPLICATION

This application is a Continuation application of U.S. patent application Ser. No. 17/564,635 filed on Dec. 29, 2021, and entitled "LIGHTING VENTILATION FAN WITH FUNCTION MODULE", which claims the benefit of U.S. Provisional Application Ser. No. 63/133,515 entitled "VENTILATION FAN WITH BLUETOOTH SPEAKER AND LED LIGHTING," filed Jan. 4, 2021. The entire contents of the above-mentioned applications are incorporated herein by reference for all purposes.

FIELD OF THE INVENTION

The present disclosure relates to a ventilation fan, and more particularly to a ventilation fan, adopting the design of a lateral-suction inlet, integrated with the lighting function and capable of adding a function module.

BACKGROUND OF THE INVENTION

A ventilation fan mainly includes a grille, a housing, an impeller and a motor. With the motor driving the fan blades to rotate and generate an airflow, the indoor air and the outdoor air are allowed to exchange, so as to achieve the effects of regulating the temperature and the humidity. Therefore, the ventilation fan is widely used in homes and public places. Moreover, the ventilation fan is allowed to integrate a lighting module to form a lighting ventilation fan so as to provide the ventilation and lighting functions.

The conventional lighting ventilation fan is mounted on the ceiling. Considering the appearance of the design, the bottom cover is often combined with the lighting module. If there is a requirement to add another function module, the function module is still added on the bottom cover. The required lighting area of the lighting module and the required space of the original inlet have to be considered at the same time.

Therefore, there is a need of providing a borderless lighting ventilation fan adopting the design of a lateral-suction inlet so as to provide sufficient lighting areas under the condition of maintaining the ventilation function of the inlet, and further integrate an additional function module.

SUMMARY OF THE INVENTION

An object of the present disclosure is to provide a lighting ventilation fan. The borderless lighting module is designed and integrated with the hidden fan module so that a lateral-suction inlet is formed. It makes the appearance smooth, round and beautiful. Moreover, the noise generated from the fan module is isolated, and the purpose of shielding the fan module is achieved. In addition, the central cover of the grille structure is combined with the detachable function module, and it contributes to the optimized performance of the function module.

Another object of the present disclosure is to provide a lighting ventilation fan. The LED light-emitting element of the lighting module adopts a lateral light-emitting design. With the light guide plate extended radially, a borderless design is achieved, and the light beams are emitted toward the axial direction and the radial direction. It is helpful of improving the problem of uneven light emission of the conventional point light source, and making the appearance more concise and beautiful.

In accordance with an aspect of the present disclosure, a lighting ventilation fan includes a housing and a grille structure. The housing has a bottom spatially corresponding to an opening of a ceiling and includes a fan module disposed within the housing. The grille structure includes a grille support, a lighting base, a plurality of connecting columns, a lighting module, a resilient element and a function module. The grille support is mounted under the ceiling and includes a grille opening spatially corresponding to the opening of the ceiling. The lighting base includes a holder, wherein the holder includes a holding opening faced away from the housing. The plurality of connecting columns are connected between the grille support and the lighting base, so that an inlet facing a radial direction is formed between the grille support and the lighting base. The lighting module is disposed on the lighting base and includes a LED light-emitting element and a light-emitting surface facing the axial direction and the radial direction. The resilient element is extended from the grille support or the lighting base, and engaged with the housing. The function module is disposed within the holder through the holding opening.

In an embodiment, the function module is one selected from the group consisting of a Bluetooth-speaker module, a night-light module, a humidity-sensor module, a germicidal-lamp module and a human-body-detector module.

In an embodiment, the lighting ventilation fan further includes a cover spatially corresponding to the holder and covering the holding opening and the function module disposed within the holder.

In an embodiment, the cover includes a plurality of grille apertures, and the function module disposed within the holder is in communication with an exterior of the cover through the plurality of grille apertures.

In an embodiment, the function module is attached adjacent to the cover to form a function region, wherein the function region, the cover and the light-emitting surface are arranged concentrically along the radial direction from inner to outer, wherein an outer diameter of the light-emitting surface is greater than that of the cover, and the outer diameter of the cover is greater than that of the function region.

In an embodiment, the LED light-emitting element of the lighting module is disposed adjacent to an outer periphery of the holder, wherein the function region and the LED light-emitting element are located on an identical axial projection plane.

In an embodiment, the light-emitting surface includes an axial light-emitting surface and a lateral light-emitting surface, the axial light-emitting surface faces the axial direction, the lateral light-emitting surface faces the radial direction, and the axial and lateral light-emitting surfaces are in connection with each other and integrally formed into one piece.

In an embodiment, an outer diameter of the light-emitting surface is greater than or equal to an outer diameter of the lighting base and an outer diameter of the grille support.

In an embodiment, the LED light-emitting element of the lighting module is located at an inner periphery of the light-emitting surface, and the lighting module includes a light guide plate having an inner periphery connected to the LED light-emitting element and extended outwardly along the radial direction; and a reflective plate connected to the LED light-emitting element and the light guide plate to form a reflective surface axially downward.

In an embodiment, the lighting module further includes a light board, and the light guide plate and the reflective plate are fixed between the light board and the lighting base, wherein the light board has a first side attached to the light guide plate and a second side opposite to the first side and configured to form the light-emitting surface.

In an embodiment, the grille support and the lighting base have a spaced height formed therebetween, the plurality of connecting columns and an outer periphery of the lighting base have an interval distance, and the interval distance is greater than the spaced height.

In an embodiment, the holder is a GU24 base socket.

In an embodiment, the lighting ventilation fan further includes a first power module, a second power module and a third power module, wherein the first power module is disposed in the housing and electrically connected to the fan module, the second power module is disposed on the lighting base and electrically connected to the lighting module, and the third power module is included in the function module and configured to be received within the holder.

In an embodiment, the grille support includes a first curve portion disposed around a periphery of the grille opening.

In an embodiment, the fan module further includes a fan-module opening in communication with the grille opening along the axial direction.

In an embodiment, a second curve portion is formed on a periphery of the fan-module opening.

In an embodiment, the grille opening is greater than the fan-module opening.

In an embodiment, the fan module includes a motor and an impeller disposed along the axial direction and configured to form a centrifugal fan.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
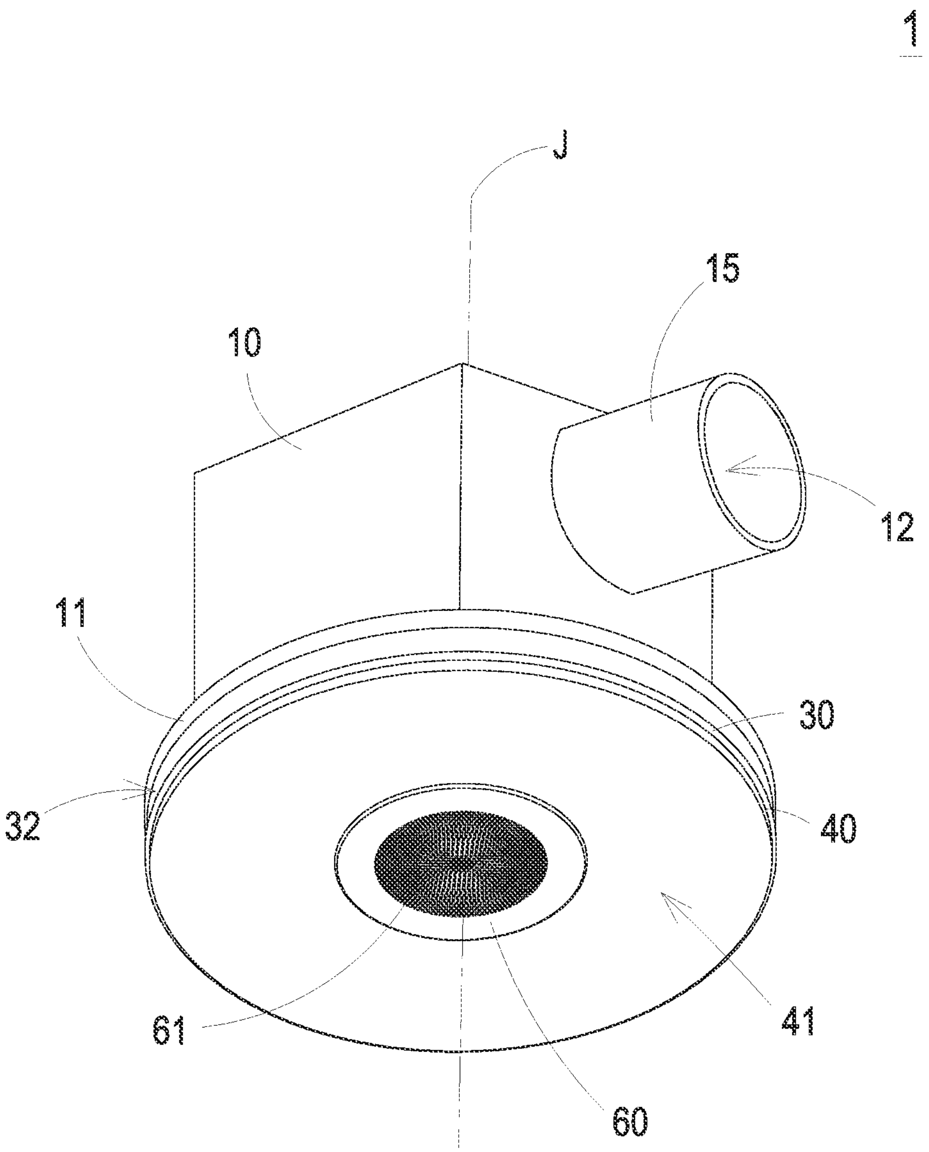
FIG. 1 is a perspective view illustrating a lighting ventilation fan according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as “axially,” “radially,” “under,” “on,” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being “connected,” or “coupled,” to another element, it can be directly connected or coupled to the other element or intervening elements may be present. Although the wide numerical ranges and parameters of the present disclosure are approximations, numerical values are set forth in the specific examples as precisely as possible. In addition, although the “first,” “second,” “third,” and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments.

FIG. 1 is a perspective view illustrating a lighting ventilation fan according to an embodiment of the present disclosure. In the embodiment, the lighting ventilation fan 1 mainly includes a housing 10, a grille support 11, a lighting base 30 and a lighting module 40 arranged along an axial direction J. The housing 10 includes a lateral (i.e., radial) outlet 12, and the outlet 12 is in communication with the housing 10 through a duct 15. The lighting base 30 is spatially corresponding to the grille support 11 and spaced apart from the grille support 11, so that an inlet 32 facing a radial direction is formed between the lighting base 30 and the grille support 11. With respect to the axial direction J, the lateral-suction inlet 32 facing the radial direction has an annular radial shape. The lighting module 40 is disposed on the lighting base 30 and includes a light-emitting surface 41 facing the axial direction J and the radial direction for light emission so that the borderless lighting ventilation fan 40 is formed. Notably, the light-emitting surface 41 not only provides a downward illumination in the axial direction J but also provides a lateral illumination in the radial direction. With the design of the borderless lighting module 40 and the lateral-suction inlet 32, it makes the appearance of the lighting ventilation fan 1 smooth, round and beautiful. In the embodiment, the lighting ventilation fan 1 further includes a cover 60. Preferable but not exclusively, the cover 60 is disposed at the center of the lighting module 40. As shown in FIG. 1, the cover 60 includes a plurality of grille apertures 61, which pass through the cover 60.

Figure 2:
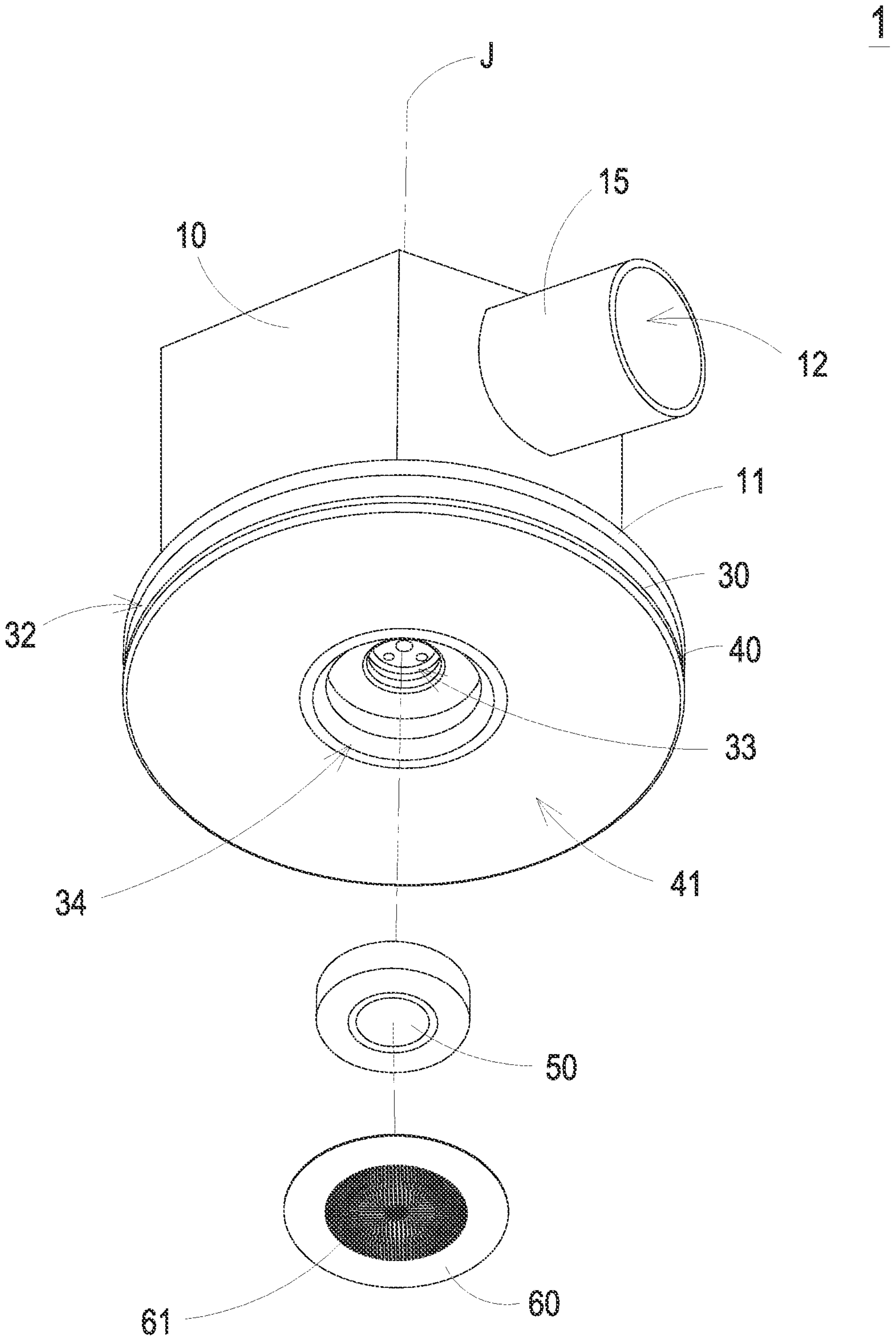
FIG. 2 is an exploded view illustrating the lighting ventilation fan according to the embodiment of the present disclosure.

FIG. 2 is an exploded view illustrating the lighting ventilation fan according to the embodiment of the present disclosure. In the embodiment, the lighting base 30 of the lighting ventilation fan 1 further includes a holder 33, which has a holding opening 34. The holding opening 34 faces downwards axially, that is, the holding opening 34 is faced away from the housing 10. Preferably but not exclusively, the holder 33 is a GU24 base socket. The holder 33 is configured to accommodate a function module 50 fitted with the GU24 base socket. In the embodiment, the disassembly of the function module 50 is performed in the axial direction J away from the housing 10. Preferably but not exclusively, the function module 50 is one selected from the group consisting of a Bluetooth-speaker module, a night-light module, a humidity-sensor module, a germicidal-lamp module and a human-body-detector module. Different function modules 50 are allowed to be optionally installed in the holder 33 so that the lighting ventilation fan 1 is provided with different additional functions. Preferably but not exclusively, during installation, the function module 50 is detachably disposed within the holder 33 by passing through the holding opening 34 from bottom to top. In the embodiment, the cover 60 is spatially corresponding to the holder 33 and covers the holding opening 34 and the function module 50 disposed within the holder 33. Preferably but not exclusively, the function module 50 is a Bluetooth-speaker module, which is installed in the holder 33 and covered by the cover 60. Preferably but not exclusively, the function module 50 of the Bluetooth-speaker module is attached adjacent to the cover 60. For example, the front surround end and the speaker cone are attached to the cover 60, and the sound is played directly under the center of the lighting ventilation fan 1 through the plurality of grille apertures 61. In the embodiment, the holder 33 and the cover 60 are located at the central bottom of the lighting ventilation fan 1, and combined with the detachable function module 50. It contributes to the optimized performance of the function module 50. In addition, since the function module 50 is detachably disposed within the holder 33, it allows the user to choose different function modules 50 for replacement according to the practical requirements so that the lighting ventilation fan 1 further provides other functions in addition to the functions of lighting and ventilation. In the embodiment, the cover 60 has the function of protecting the function module 50, and the appearance is more beautiful. Preferably but not exclusively, in an embodiment, the cover 60 and the light-emitting surface 41 are coplanar.

Figure 3:
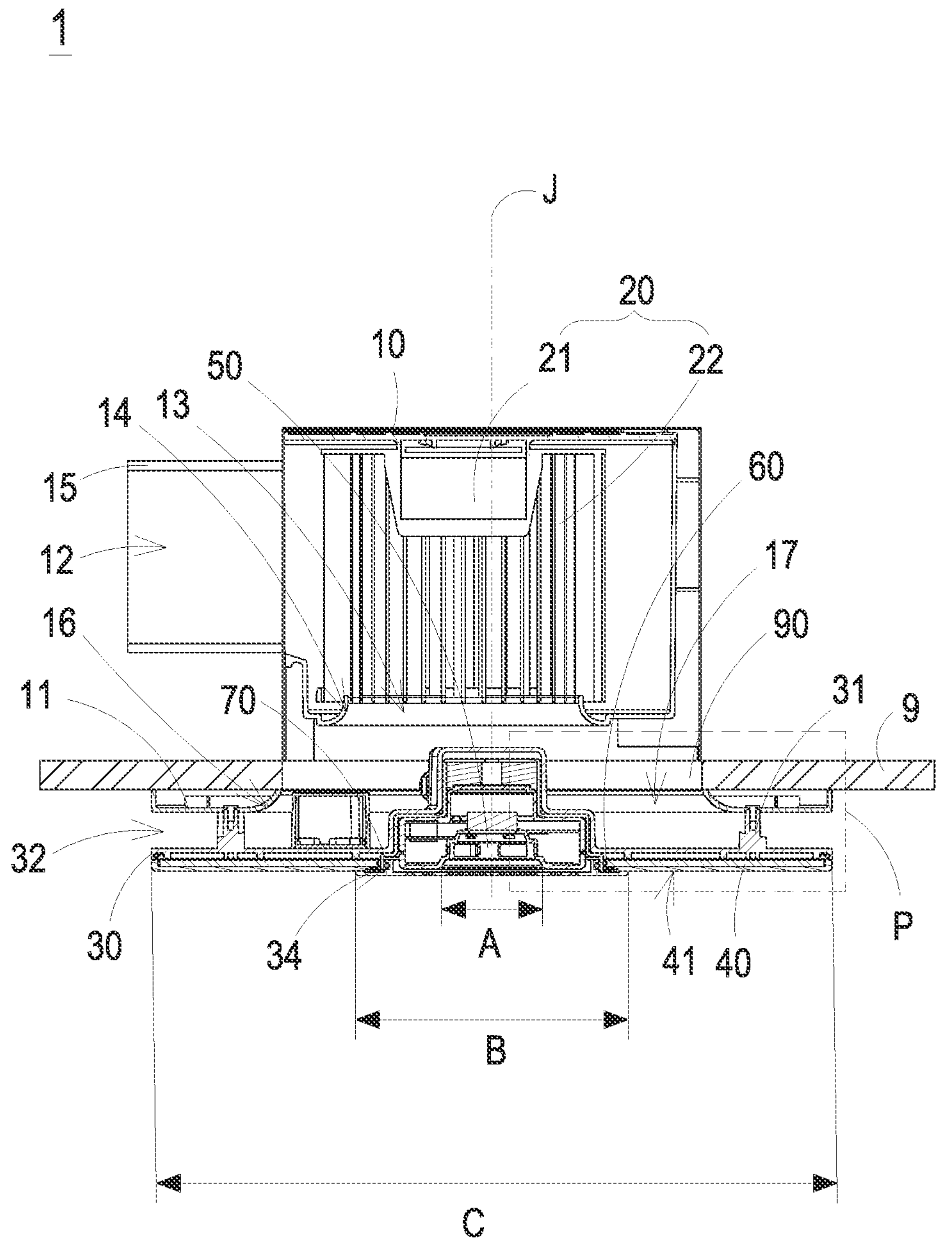
FIG. 3 is a cross-section view illustrating the lighting ventilation fan mounted on the ceiling according to the embodiment of the present disclosure.

FIG. 3 is a cross-section view illustrating the lighting ventilation fan mounted on the ceiling according to the embodiment of the present disclosure. In the embodiment, the lighting ventilation fan 1 includes the housing 10, the grille support 11, the fan module 20, the lighting base 30, the lighting module 40, the function module 50 and the cover 60. The grille support 11 is abutted and connected to a ceiling 9. The bottom of the housing 10 is spatially corresponding to the opening 90 of the ceiling 9. The grille support 11 includes a grille opening 17 spatially corresponding to the opening 90 of the ceiling 9. The outlet 12 connected to the duct 15 is in communication with the fan module 20. The fan module 20 is disposed within the housing 10 and includes a motor 21 and an impeller 22 disposed along the axial direction J and configured to form a centrifugal fan. In the embodiment, the fan module 20 includes a fan-module opening 13 facing the ceiling 9 in the axial direction J. The fan-module opening 13 faces towards the opening 90 of the ceiling 9. In the embodiment, the lighting base 30 is spatially corresponding to the grille support 11. The plurality of the connecting columns 31 are connected between the grille support 11 and the lighting base 30 so that the grille support 11 and the lighting base 30 are spaced apart from each other. Moreover, the inlet 32 facing the radial direction is formed between the lighting base 30 and the grille support 11 and among the intervals of the connecting columns 31. Preferably but not exclusively, the plurality of connecting columns 31 and the grille support 11 are connected and disassembled the bolts. As shown in FIG. 3, the airflow generated by the fan module 20 is introduced through the lateral-suction inlet 32, flows through the grille opening 17, the opening 90 of the ceiling 9 and the fan-module opening 13, and then is discharged out through the duct 15 and the outlet 12. Moreover, in the embodiment, the grille support 11 includes a first curve portion 16 disposed around a periphery of the grille opening 17. A second curve portion 14 is formed on a periphery of the fan-module opening 13. Preferably but not exclusively, the grille opening 17 is greater than the fan-module opening 13. In the embodiment, the first curve portion 16 disposed around the periphery of the grille opening 17 and the second curve portion 14 disposed around the periphery of the fan-module opening 13 form chamfering structures so that the airflow generated by the fan module 20 is introduced through the lateral-suction inlet 32, flows through the grille opening 17, the opening 90 of the ceiling 9 and the fan-module opening 13, and is discharged out through the duct 15 and the outlet 12 more smoothly. The generation of noise is reduced.

Please refer to FIG. 1 and FIG. 3. Preferably but not exclusively, in the embodiment, the function module 50 is a Bluetooth-speaker module and attached adjacent to the cover 60. For example, the front surround end and the speaker cone are attached to the cover 60 to form a function region. The function region of the function module 50, the cover 60 and the light-emitting surface 41 of the lighting module 40 are arranged concentrically along the radial direction from inner to outer. In the embodiment, the function region and the LED light-emitting element 43 are located on an identical axial projection plane. Preferably but not exclusively, an outer diameter C of the light-emitting surface 41 is greater than an outer diameter B of the cover 60, and the outer diameter B of the cover 60 is greater than an outer diameter A of the function region. In addition, the outer diameter C of the light-emitting surface 41 is greater than or equal to an outer diameter of the lighting base 30 and an outer diameter of the grille support 11. Thereby, the lighting ventilation fan 1 forms a smooth and round appearance, and the effect of shielding the grille opening 17 is achieved. In addition, since the lighting module 40 with a borderless design is extended in the radial direction, the light beams generated from the light-emitting surface 41 in the axial direction and the radial direction are uniform and bright, and it makes the appearance concise and beautiful. The cover 60 located at the center is combined with the detachable function module 50 disposed within the holder 33 so that the function module 50 disposed within the holder 33 is in communication with an exterior of the cover 60 through the plurality of grille apertures 61. It contributes to the optimized performance of the function module 50. Furthermore, in conjunction with the design of the lateral-suction inlet 32 in the radial direction, the bottom of the lighting ventilation fan 1 forms a smooth, round and beautiful appearance, and it is further helpful of isolating the noise generated by the fan module 20.

Figure 4:
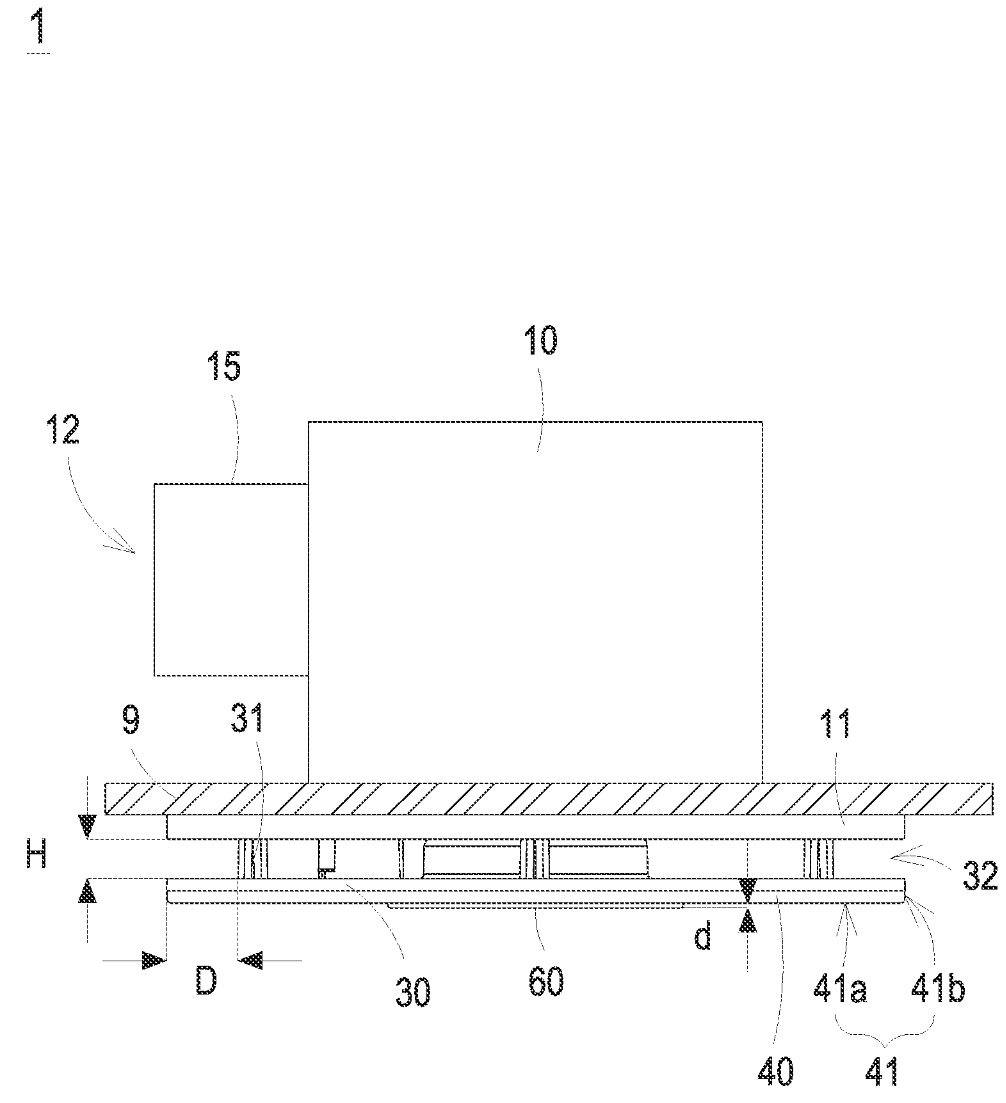
FIG. 4 is a lateral view illustrating the lighting ventilation fan mounted on the ceiling according to the embodiment of the present disclosure.

FIG. 4 is a lateral view illustrating the lighting ventilation fan mounted on the ceiling according to the embodiment of the present disclosure. In the embodiment, the grille support 11 and the lighting base 30 are connected through the plurality of the connecting columns 31 to be spaced apart from each other. In the embodiment, the grille support 11 and the lighting base 30 have a spaced height H formed therebetween. Preferably but not exclusively, the spaced height H is equal to the height of the plurality of connecting columns 31. In addition, the spaced height H is the height of the lateral-suction inlet 32. In the embodiment, the plurality of connecting columns 31 are arranged in a ring shape. Preferably but not exclusively, each connecting column 31 and an outer periphery of the lighting base 30 have an interval distance D. In order to hide the connecting columns 31 effectively, the interval distance D from each connecting column 31 to the outer periphery of the lighting base 30 is greater than the spaced height H between the grille support 11 and the lighting base 30 so that the connecting columns 31 cannot be seen from any angle of view under the lighting ventilation fan 1.

Notably, the light-emitting surface 41 of the lighting module 40 includes an axial light-emitting surface 41*a* and a lateral light-emitting surface 41*b*. Preferably but not exclusively, the axial light-emitting surface 41*a* faces the axial direction J, the lateral light-emitting surface 41*b* faces the radial direction, and the axial light-emitting surface 41*a* and the lateral light-emitting surface 41*b* are in connection with each other and integrally formed into one piece so as to form the borderless lighting module 40.

Please refer to FIG. 3 and FIG. 4. Preferably but not exclusively, in the embodiment, the cover 60 is fitted into the holding opening 34 through a rubber 70 so that the surface of the cover 60 forms a protrusion height d relative to the light-emitting surface 41. Preferably but not exclusively, the protrusion height d is a small height and the cover 60 has the sufficient structural strength to cover a part of the inner edge of the lighting module 40. In that, the light beams emitted from the light-emitting surface 41 of the lighting module 40 are not affected by the surface of the cover 60.

Figure 5:
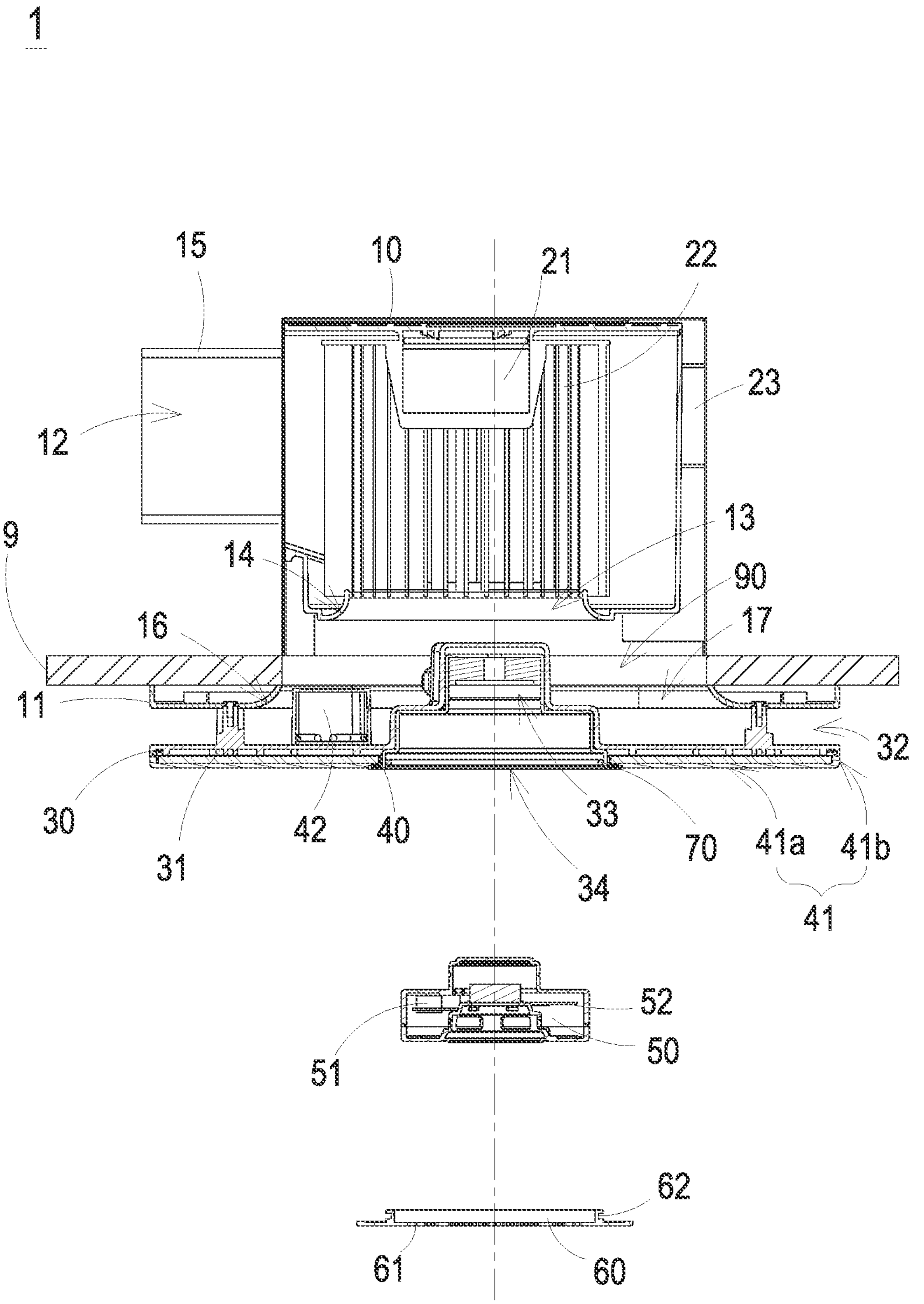
FIG. 5 is a cross-sectional view illustrating the lighting ventilation fan having the function module and the grille structure disassembled according to the embodiment of the present disclosure.

FIG. 5 is a cross-sectional view illustrating the lighting ventilation fan having the function module and the grille structure disassembled according to the embodiment of the present disclosure. In the embodiment, the function module 50 is detachably disposed within the holder 33. Preferably but not exclusively, the outer shape of the function module 50 is matched with the holder 33 so as to be accommodated in the holder 33 completely. In the embodiment, the cover 60 includes an engaging groove 62. When the cover 60 is fitted into the holding opening 34, the rubber 70 is partially accommodated in the engaging groove 62, and the cover 60 and the holding opening 34 form an interference fit. Thus, the fixation of the cover 60 is achieved. Certainly, the method of fitting the cover 60 into the holding opening 34 is adjustable according to the practical requirement, and the present disclosure is not limited thereto.

Notably, in the embodiment, the function module 50 is for example but not limited to the Bluetooth-speaker module, the night-light module, the humidity-sensor module, the germicidal-lamp module or the human-body-detector module. Moreover, the function module 50 is detachably disposed within the holder 33. Therefore, it allows the user to choose different function modules 50 to install in the holder 33 according to the practical requirements so as to realize the applications with different requirements. Preferably but not exclusively, in the embodiment, each of the fan module 20, the lighting module 40 and the function module 50 has an independent power supply. In the embodiment, the lighting ventilation fan 1 further includes a first power module 23, a second power module 42 and a third power module 51. The first power module 23 is disposed in the housing 10 and electrically connected to the fan module 20, so as to provide an independent power supply for the fan module 20. The second power module 42 is disposed on the lighting base 30 and electrically connected to the lighting module 40 so as to provide an independent power supply for the lighting module 40. The third power module 51 is included in the function module 50. When the function module 50 is disposed within the holder 33, the third power module 51 is received within the holder 33. Preferably but not exclusively, in the embodiment, the function module 50 is an independent functional device. In addition to the third power module 51, the function module 50 further includes a circuit board 52 and related components. After the function module 50 is disposed within the holder 33 and the cover 60 is fitted into the holding opening 34, the entire appearance remains flatten and round. Since the fan module 20, the lighting module 40 and the function module 50 are supplied with power by the first power module 23, the second power module 42 and the third power module 51, respectively, each of them is independent and easy to maintain.

Figure 6:
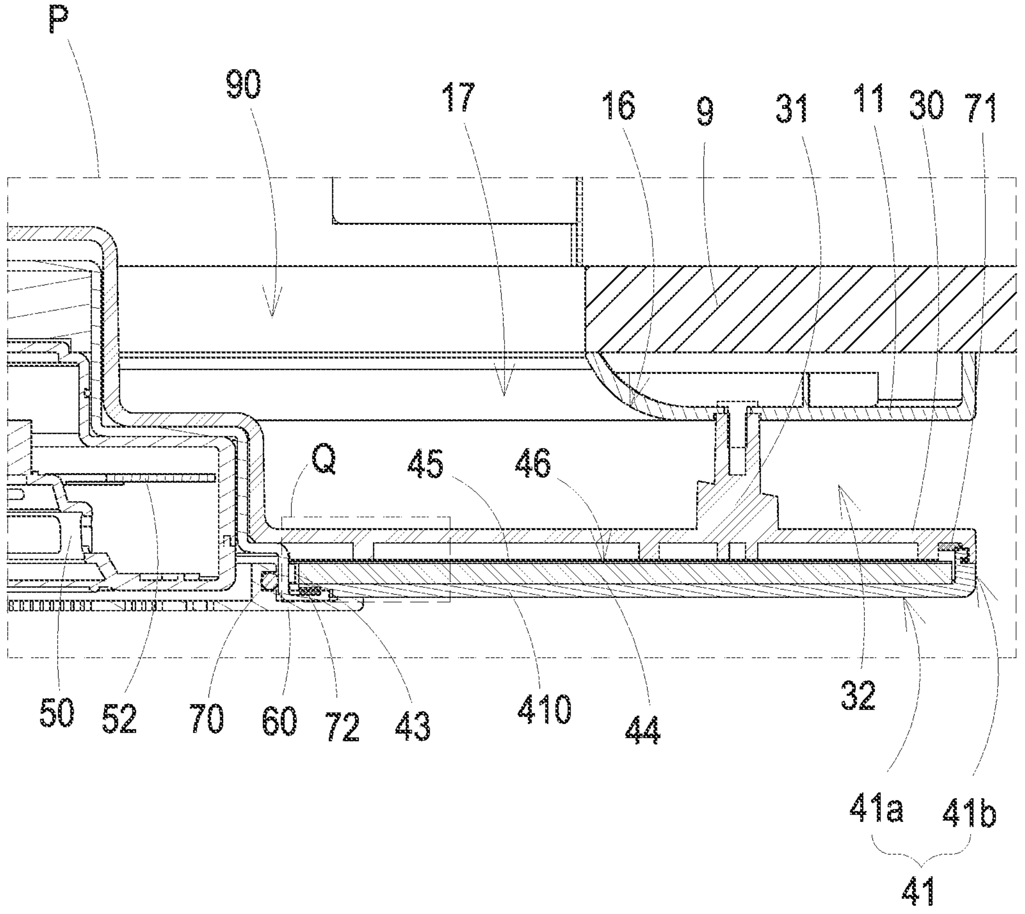
FIG. 6 shows an enlarged view of the region P in FIG. 3.

FIG. 6 shows an enlarged view of the region P in FIG. 3. In the embodiment, the lighting module 40 includes a LED light-emitting element 43, which is located at an inner periphery of the light-emitting surface 41, and regarded as be disposed adjacent to an outer periphery of the holder 33. In order to maintain the concise appearance of the bottom of the lighting ventilation fan 1, the holder 33, the holding opening 34, and the LED light-emitting element 43 are included in a projection range of the cover 60 in the axial direction J. Thereby, after the cover 60 is fitted into the holding opening 34, the holder 33, the holding opening 34, the LED light-emitting element 43, the rubber 70 and the adhesive rubber 72 are covered by the cover 60 completely, and the bottom of the lighting ventilation fan 1 remains the concise appearance. In the embodiment, the light-emitting surface 41 of the lighting module 40 is arranged in a ring shape, and the LED light-emitting element 43 is arranged laterally on the inner periphery of the light-emitting surface 41. The light beams of the LED light-emitting element 43 are emitted in the radial direction with respect to the axial direction J. In the embodiment, the lighting module 40 further includes a light guide plate 44, a reflective plate 45 and a light board 410. Preferably but not exclusively, the light board 410 is assembled with the lighting base 30 through the adhesive rubber 71 and the adhesive rubber 72 so that the light guide plate 44 and the reflective plate 45 are fixed between the light board 410 and the lighting base 30. In the embodiment, the light guide plate 44 has a specific thickness. Preferably but not exclusively, the light guide plate 44 has an inner periphery connected to the LED light-emitting element 43 and is extended outwardly along the radial direction. In the embodiment, the reflective plate 45 is arranged along the radial direction and connected to the LED light-emitting element 43 and the light guide plate 44, so as to form a reflective surface 46 facing downwards axially. Thus, the light beams emitted radially from the LED light-emitting element 43 are diffused by the light guide plate 44 and reflected by the reflective surface 46 of the reflective plate 45 so that the lighting generated from the axial light-emitting surface 41*a* and the lateral light-emitting surface 41*b* is uniformed and soft.

In the embodiment, the light guide plate 44 has one side attached to the reflective surface 46 of the reflective plate 45, and another side attached to the light board 410. Preferably but not exclusively, in the embodiment, the light board 410 has a first side attached the light guide plate 44 and a second side opposite to the first side and configured to form the light-emitting surface 41.

Figure 7:
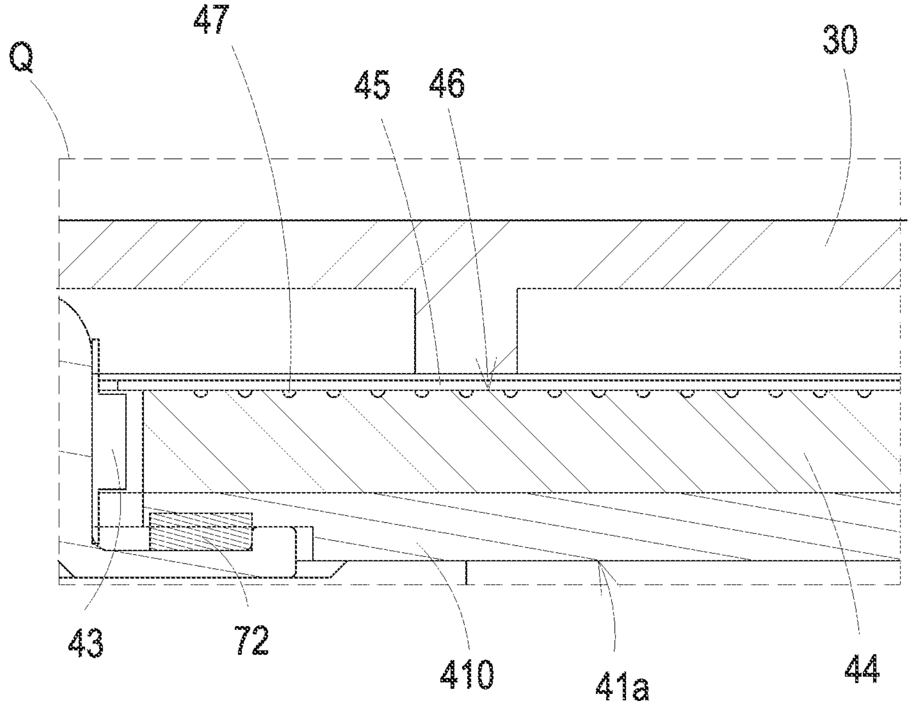
FIG. 7 shows an enlarged view of the region Q in FIG. 6.

FIG. 7 shows an enlarged view of the region Q in FIG. 6. In the embodiment, the light guide plate 44 further includes a plurality of micro structures 47, which are arranged adjacent to the junction of the light guide plate 44 and the reflective plate 45 so that the light beams of the LED light-emitting element 43 diffused through the light guide plate 44 is reflected uniformly by the reflective surface 46 of the reflective plate 45. Preferably but not exclusively, the micro structures 47 are bumps. In other embodiments, the number, the size, the position, and the arrangement of the micro structures 47 are adjustable according to the practical requirements. Preferably but not exclusively, the micro structure 47 further includes metal powders for scattering light. Please refer to FIG. 6 and FIG. 7 again. In the embodiment, the LED light-emitting element 43 is disposed adjacent to the light guide plate 44, and the adhesive rubber 72 for bonding the light board 410 and the lighting base 30 are covered by the cover 60 so that the generation of bright spots or the shadows is avoided and the light-emitting surface 41 remains the concise appearance.

Figure 8:
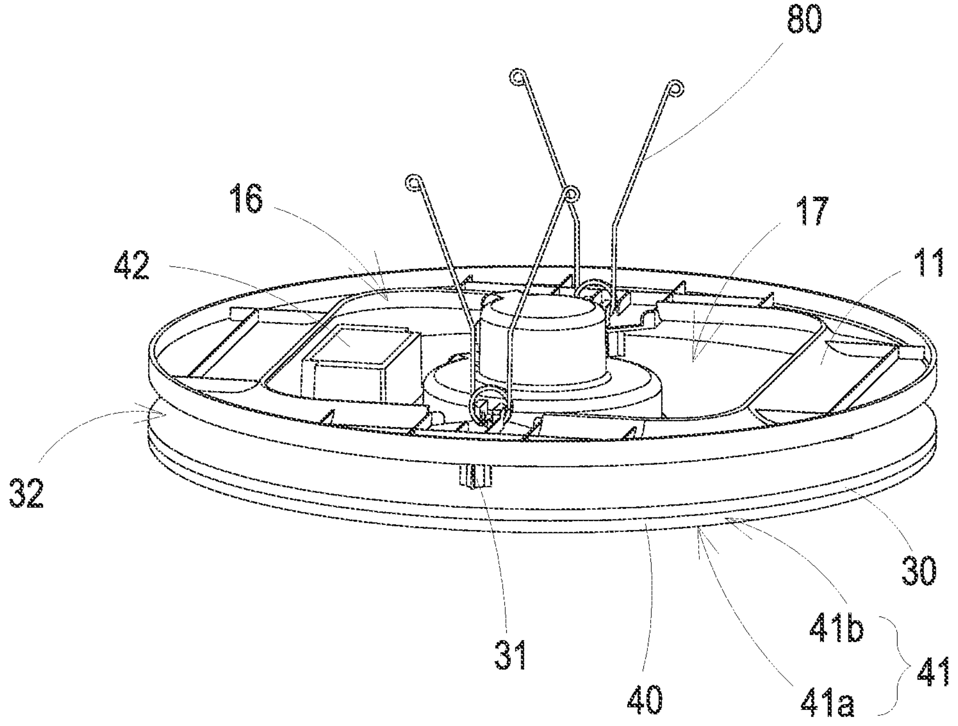
FIG. 8 shows a perspective view illustrating the grille structure of the lighting ventilation fan according to the embodiment of the present disclosure.

FIG. 8 shows a perspective view illustrating the grille structure of the lighting ventilation fan according to the embodiment of the present disclosure. In the embodiment, the grille support 11, the lighting base 30 and the lighting module 40 are assembled to form the grille structure. The grille structure further includes a resilient element 80, such as a torsional spring, which is connected to the grille support 11 and disposed adjacent to the periphery of the grille opening 17. In other embodiments, the resilient element 80 is extended from the grille support 11 or the lighting base 30. The present disclosure is not limited thereto. With the resilient element 80 engaged with the housing 10, the grill structure is fixed and attached under the ceiling 9. In the embodiment, since the outer diameter formed by the axial light-emitting surface 41*a* and the lateral light-emitting surface 41*b* of the lighting module 40 is equal to the outer diameter of the lighting base 30 and the outer diameter of the grille support 11, the lateral-suction inlet 32 is flatly formed between the grille support 11 and the lighting base 30. In other embodiments, as the lighting module 40 is further extended outwardly in the radial direction, the lighting function is provided by the axial light-emitting surface 41*a* and the side light-emitting surface 41*b*, and the lighting module 40 also plays a role in covering the connecting column 31, the lighting base 30 and the grille support 11 at the same time. In addition, the holder 33 disposed in the lighting base 30 and the second power module 42 disposed on the lighting base 30 are partially accommodated in the grille opening 17, and located in the axial projection region of the grille opening 17 so as to be covered completely.

Please refer to FIG. 1, FIG. 2 and FIG. 8. In the embodiment, when replacing the function module 50, only the cover 60 needs to be removed axially, and the entire grille structure does not need to be detached. It is convenient for the user to install and use.

In summary, the present disclosure provides a lighting ventilation fan. The borderless lighting module is designed and integrated with the hidden fan module, so that a lateral-suction inlet is formed. It makes the appearance smooth, round and beautiful. Moreover, the noise generated from the fan module is isolated and the purpose of shielding the fan module is achieved. In addition, the central cover of the grille structure is combined with the detachable function module, and it contributes to the optimized performance of the function module. Moreover, the LED light-emitting element of the lighting module adopts a lateral light-emitting design. With the light guide plate extended radially, a borderless design is achieved, and the light beams are emitted toward the axial direction and the radial direction. It is helpful of improving the problem of uneven light emission of the conventional point light source, and making the appearance more concise and beautiful.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A ventilation fan, comprising:

a housing having a bottom opening, and a fan module;

a grille support configured to be mounted under a ceiling and spatially corresponding to the bottom opening;

a grille opening corresponding to the bottom opening;

a base including a holder with a holding opening facing away from the housing;

a plurality of connecting columns provided between the grille support and the base, so that an inlet facing a radial direction is formed between the grille support and the base;

a resilient element extending from the grille support or the base, and configured to engage the housing; and a function module detachably disposed within the holder through the holding opening, wherein the function module is spatially separated from an airflow generated by the fan module.

2. The ventilation fan according to claim 1, wherein the function module is one selected from the group consisting of a Bluetooth-speaker module, a light module, a humidity-sensor module, a germicidal-lamp module and a human-body-detector module.

3. The ventilation fan according to claim 1, wherein the grille support and the base have a spaced height formed therebetween, the plurality of connecting columns and an outer periphery of the base have an interval distance, and the interval distance is greater than the spaced height.

4. The ventilation fan according to claim 1, wherein the holder is a GU24 base socket.

5. The ventilation fan according to claim 1, wherein the fan module comprises a motor and an impeller disposed along the axial direction and configured to form a centrifugal fan.

6. The ventilation fan according to claim 1, further comprising a cover spatially corresponding to the holder and covering the holding opening and the function module disposed within the holder.

7. The ventilation fan according to claim 6, wherein the cover comprises a plurality of grille apertures, and the function module disposed within the holder is in communication with an exterior of the cover through the plurality of grille apertures.

8. The ventilation fan according to claim 6, wherein the function module is attached adjacent to the cover to form a function region, wherein the function region and the cover are arranged concentrically along the radial direction from inner to outer, wherein an outer diameter of the cover is greater than an outer diameter of the function region.

9. The ventilation fan according to claim 1, wherein the grille support comprises a first curve portion disposed around a periphery of the grille opening.

10. The ventilation fan according to claim 9, wherein the fan module further comprises a fan-module opening in communication with the grille opening along the axial direction.

11. The ventilation fan according to claim 10, wherein a second curve portion is formed on a periphery of the fan-module opening.

12. The ventilation fan according to claim 10, wherein the grille opening is greater than the fan-module opening.

* * * * *